(12) United States Patent
Zhang

(10) Patent No.: US 10,474,319 B2
(45) Date of Patent: Nov. 12, 2019

(54) METHODS AND INSTANT MESSAGING CLIENT DEVICES FOR PERFORMING IM USING MENU OPTION

(71) Applicant: Tencent Technology (Shenzhen) Company Limited, Shenzhen (CN)

(72) Inventor: Xiaolong Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 331 days.

(21) Appl. No.: 13/994,643

(22) PCT Filed: Apr. 25, 2013

(86) PCT No.: PCT/CN2013/074738
§ 371 (c)(1),
(2) Date: Jun. 14, 2013

(87) PCT Pub. No.: WO2014/172880
PCT Pub. Date: Oct. 30, 2014

(65) Prior Publication Data
US 2014/0325385 A1    Oct. 30, 2014

(51) Int. Cl.
*G06F 3/0482* (2013.01)
*H04L 12/58* (2006.01)
*G06Q 10/10* (2012.01)

(52) U.S. Cl.
CPC ......... *G06F 3/0482* (2013.01); *G06Q 10/107* (2013.01); *H04L 51/04* (2013.01)

(58) Field of Classification Search
CPC ..... G06F 3/0482; H04L 12/582; H04L 51/04; H04L 51/046; H04L 51/36; G06Q 10/107
See application file for complete search history.

(56) References Cited

U.S. PATENT DOCUMENTS 5,625,783 A * 4/1997 Ezekiel ................. G06F 3/0482
                                                       345/902
5,644,737 A * 7/1997 Tuniman et al. ............. 715/810
(Continued)

FOREIGN PATENT DOCUMENTS

| CN | 1744582 | 3/2006 |
|---|---|---|
| CN | 101067777 | 11/2007 |
| CN | 101478410 | 7/2009 |

OTHER PUBLICATIONS

Wang, Lois (Mar. 19, 2013). "Wechat public platform provides a self-customized menu interface. Closed beta is provided upon application." Retrieved from Tencent Technology website: tech.qq.com/a/20130319/000080.htm.
(Continued)

*Primary Examiner* — Kieu D Vu
*Assistant Examiner* — Blaine T. Basom
(74) *Attorney, Agent, or Firm* — Morgan, Lewis & Bockius LLP

(57) ABSTRACT

This disclosure provides an IM method and an IM client device. In the method, menu options are deployed on a session interface displayed on a viewing screen of an IM client device. The method includes generating, by an IM client device, a first event request when a user clicks on a first menu option on the session interface; sending, by the IM client device, the first event request to a third-party server via an IM server; and receiving, by the IM client device, a first event response from the third-party server via the IM server. With the technical scheme of the present disclosure, more personalized services may be provided to the user.

10 Claims, 4 Drawing Sheets

(56) References Cited

U.S. PATENT DOCUMENTS

| | | | | |
|---|---|---|---|---|
| 6,430,602 B1* | 8/2002 | Kay | ................... | G06F 17/30867 |
| | | | | 707/999.003 |
| 7,487,455 B2* | 2/2009 | Szeto | ................... | G06F 3/0483 |
| | | | | 709/206 |
| 7,725,128 B2* | 5/2010 | Marsh | ................... | G06Q 10/107 |
| | | | | 455/556.1 |
| 7,814,425 B1* | 10/2010 | O'Shaugnessy | ..... | G06Q 10/107 |
| | | | | 715/752 |
| 9,031,216 B1* | 5/2015 | Kamvar et al. | .......... | 379/202.01 |
| 2004/0078424 A1* | 4/2004 | Yairi et al. | .................... | 709/203 |
| 2005/0210396 A1* | 9/2005 | Galli | ............................. | 715/758 |
| 2005/0234883 A1* | 10/2005 | Szeto | ................... | G06F 17/30985 |
| 2006/0294189 A1* | 12/2006 | Natarajan et al. | ............ | 709/206 |
| 2007/0043878 A1* | 2/2007 | Carlson et al. | ................ | 709/246 |
| 2008/0215678 A1* | 9/2008 | Coletrane | ............... | H04L 51/04 |
| | | | | 709/204 |
| 2010/0037153 A1* | 2/2010 | Rogers | ................. | G06F 3/0481 |
| | | | | 715/758 |
| 2010/0064018 A1* | 3/2010 | Luo | ................... | G06F 17/30905 |
| | | | | 709/206 |
| 2010/0088632 A1* | 4/2010 | Knowles | ............... | G06F 3/0485 |
| | | | | 715/784 |
| 2010/0185951 A1* | 7/2010 | Nichols | ............... | H04L 65/4015 |
| | | | | 715/738 |
| 2012/0296994 A1 | 11/2012 | Borisov | | |
| 2014/0236930 A1* | 8/2014 | Matthews et al. | ............ | 707/722 |

OTHER PUBLICATIONS

Wang, Zhuang (Mar. 26, 2013). "The customized menu function of the Kr Wechat public account has been online." Retrieved from 36Kr website: http://36kr.com/p/202161.html.

First Office Action and Search Report for Chinese Patent Application No. 2013101483387, dated May 6, 2015.

International Search Report for International Application No. PCT/CN2013/074738, dated Jan. 9, 2014.

* cited by examiner

METHODS AND INSTANT MESSAGING CLIENT DEVICES FOR PERFORMING IM USING MENU OPTION

CLAIM OF PRIORITY

This application is a U.S. National Phase application under 35 U.S.C. § 371 of International Application No. PCT/CN2013/074738, filed Apr. 25, 2013, entitled "METHODS AND INSTANT MESSAGING CLIENT DEVICES FOR PERFORMING IM USING MENU OPTION" the entire contents of which are incorporated herein by reference.

FIELD OF THE INVENTION

The present disclosure relates to a field of Instant Messaging (IM), and more particularly, to methods and IM client devices for performing the IM using a menu option.

BACKGROUND

Instant Messaging (IM) is a form of communication over the Internet that offers quick transmission of messages from sender to receiver. It may address point-to-point communications as well as multicast communications from one sender to many receivers. More advanced instant messaging allows enhanced modes of communication, such as live voice or video calling, video chat and inclusion of hyperlink to media.

WeChat is a new and powerful IM tool. WeChat supports sending voice, video, photo and text messages. With the WeChat, the user may also do group chats, or find new friends nearby to talk to. WeChat works on devices, on which intelligent Operating Systems (OS)s are installed, such as iOS, Android, Windows Phone, Symbian and Blackberry devices. The devices, on which the intelligent OSs are installed, are called intelligent devices. The intelligent device, on which the IM software is installed, is called an IM client device. After the WeChat is installed on the IM client device, the user may log on the WeChat, open a session interface, and chat with a friend. At present, information sending options in the information sending mode are displayed on the session interface. After clicking on the information sending options, the user may send voice, video, photo and text messages to his/her friends via an IM server.

At present, all the interactions are performed between the IM client device and the IM server. Along with the increasingly personalized requirements of the user, due to the limitation of the development ability of the service provider, the functions provided by the IM server cannot satisfy the requirements of the user.

SUMMARY

In view of the above, the present disclosure provides methods and IM client devices for performing the IM using a menu option, which provides more personalized services to the user.

An IM method is provided. Menu options are deployed on a session interface displayed on a viewing screen of an IM client device.

The method includes:
generating, by an IM client device, a first event request when a user clicks on a first menu option on the session interface;

sending, by the IM client device, the first event request to a third-party server via an IM server; and
receiving, by the IM client device, a first event response from the third-party server via the IM server.

An IM client device includes: a processor, a memory, an interface and a viewing screen.

The memory is to store menu options; and
the processor is to
send the menu options to the viewing screen which displays the menu options on a session interface;
generate a first event request when a user clicks on a first menu option on the session interface;
send, via the interface, the first event request to a third-party server via an IM server; and
receive, via the interface, a first event response from the third-party server via the IM server.

An IM client device for performing IM using a menu option, comprising: a processor, a memory, an interface and a viewing screen; wherein
the interface is to receive menu options configured by an IM server or a third-party server from the IM server;
the viewing screen is to display the menu options when a menu mode is selected, and display information sending options when an information sending mode is selected;
wherein the menu options comprise: a first-level menu to an Nth-level menu, wherein N is an integer larger than 1
the memory is to store the menu options; and
the processor is to
determine, when a user clicks on an Mth-level menu, whether there is a (M+1)th-level menu;
generate an event request if there is no (M+1)th-level menu, otherwise, generating the event request when the user clicks on a menu option in the (M+1)th-level menu; wherein M is an integer larger than 1 and less than N−1,
send the first event request to a third-party server via an IM server; and
receive a first event response from the third-party server via the IM server.

In the present disclosure, the IM client device sends the event request to the third-party server via the IM server and receives the event response from the third-party server via the IM server. Since the user may receive the event response from the third-party, the user may receive more personalized services from the third-party server. The technical scheme of the present disclosure establishes interactions between the IM client device and the third-party server, which may provide more personalized services to the user.

DETAILED DESCRIPTION

For simplicity and illustrative purposes, the present disclosure is described by referring to non-limiting examples. In the following description, numerous specific details are set forth in order to provide a thorough understanding of the present disclosure. It will be readily apparent however, that the present disclosure may be practiced without limitation to these specific details. In some instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1:
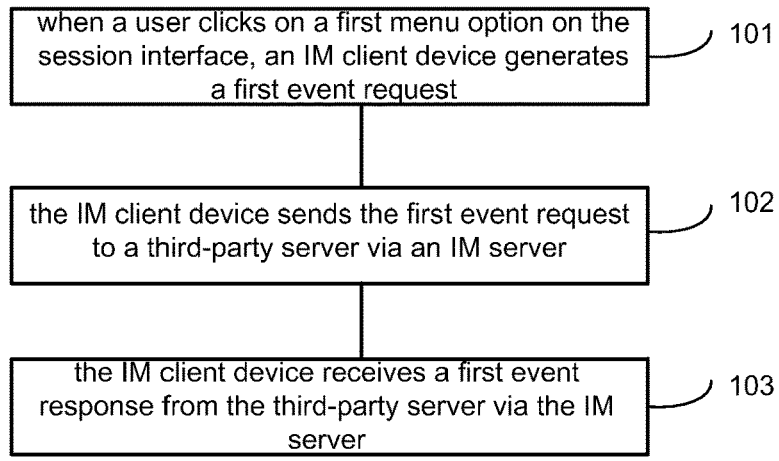
FIG. 1 is a flow chart illustrating a first IM method in accordance with an example of the present disclosure.

Referring to FIG. 1, FIG. 1 is a flow chart illustrating a first IM method in accordance with an example of the present disclosure.

In this method, menu options are deployed on a session interface displayed on a viewing screen of an IM client device. The IM method includes the following blocks.

In block 101, when a user clicks on a first menu option on the session interface, an IM client device generates a first event request.

In block 102, the IM client device sends the first event request to a third-party server via an IM server.

In block 103, the IM client device receives a first event response from the third-party server via the IM server.

Figure 2:
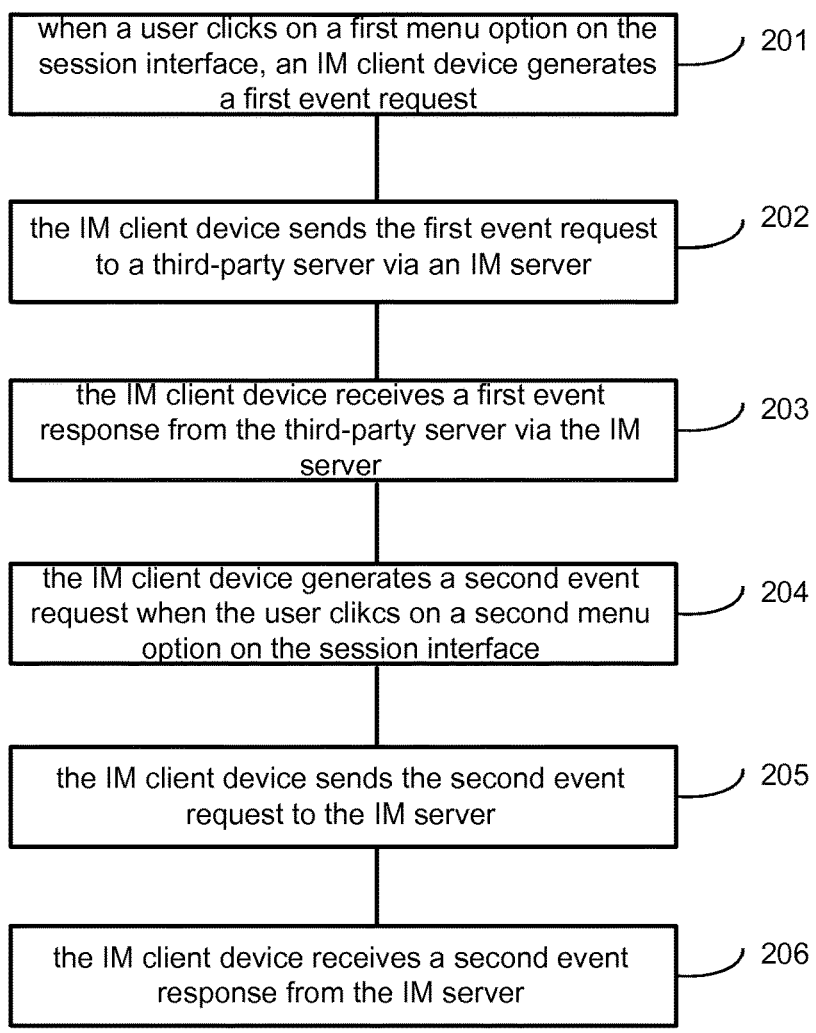
FIG. 2 is a flow chart illustrating a second IM method in accordance with an example of the present disclosure.

Referring to FIG. 2, FIG. 2 is a flow chart illustrating a second IM method in accordance with an example of the present disclosure.

In this method, menu options are deployed on a session interface displayed on a viewing screen of an IM client device. The IM method includes the following blocks.

In block 201, when a user clicks on a first menu option on the session interface, an IM client device generates a first event request.

In block 202, the IM client device sends the first event request to a third-party server via an IM server.

In block 203, the IM client device receives a first event response from the third-party server via the IM server.

In block 204, the IM client device generates a second event request when the user clicks on a second menu option on the session interface.

In block 205, the IM client device sends the second event request to the IM server.

In block 206, the IM client device receives a second event response from the IM server.

In the alternative, blocks 204-206 may be performed before blocks 201-203.

In block 202, the IM client device may send a voice, a video, a photo or a text message to a developer's server via the IM server. Accordingly, in block 203, the IM client device receives an event response made by the developer's server according to the voice, video, photo or text message via the IM server.

In block 202, the IM client device may also send a web viewing request to a web server via the IM server. Accordingly, in block 203, the IM client device displays a web pushed by the web server. In practice, a link is set between a menu option and a URL. When the user clicks on the menu option, the web viewing request is sent to the IM server, the IM server forwards the web viewing request to the web server, and the web server pushes the web to the IM client device for displaying.

Figure 3:
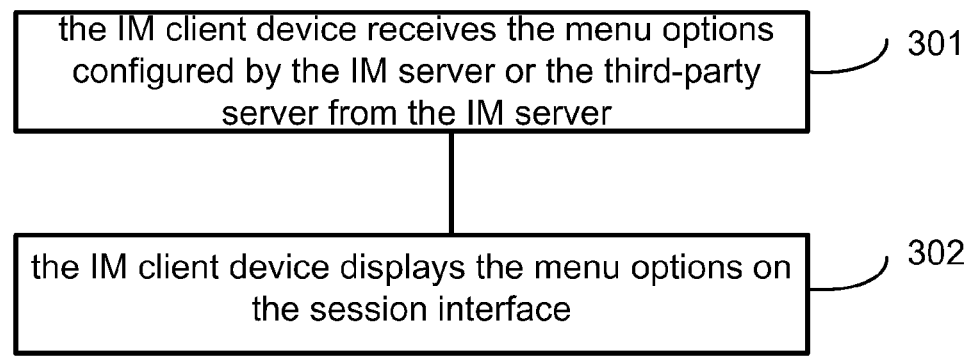
FIG. 3 is a flow chart illustrating a method for deploying the menu options on the session interface.

As mentioned above, menu options are deployed on a session interface displayed on a viewing screen of an IM client device. Referring to FIG. 3, FIG. 3 is a flow chart illustrating a method for deploying the menu options on the session interface. The method includes the following blocks.

In block 301, the IM client device receives the menu options configured by the IM server or the third-party server from the IM server.

In block 302, the IM client device displays the menu options on the session interface.

In practice, the IM client device may display the menu options in a row on the top or at the bottom of the session interface. In the alternative, the IM client device may display the menu options at any location of the session interface, and the user may drag and release the menu options at any location for ease of use.

In practice, the menu options may be made by the IM server or the third-party server. The IM server and the third-party server may periodically or randomly update the menu options. After the menu options are updated, the IM client device receives the menu options updated by the IM server or the third-party server from the IM server, and replaces the menu options with the menu options updated by the IM server or the third-party server, and displays the menu options updated by the IM server or the third-party server.

In practice, the IM client device may be a small intelligent device, such as the mobile phone, pad, and the size of the viewing screen of the IM client device is small. Taking into account of the input of the information, such as the text message, information sending options are also deployed on the session interface displayed on the viewing screen. Generally, in order to reduce the size of the viewing screen occupied by the menu options and the information sending options, the menu options and the information sending options may be displayed at the same location, such as the bottom of the viewing screen. In block 302, the displaying method may include displaying the menu options on the viewing screen when a menu mode is selected, and displaying the information sending options on the viewing screen when an information sending mode is selected.

Figure 4:
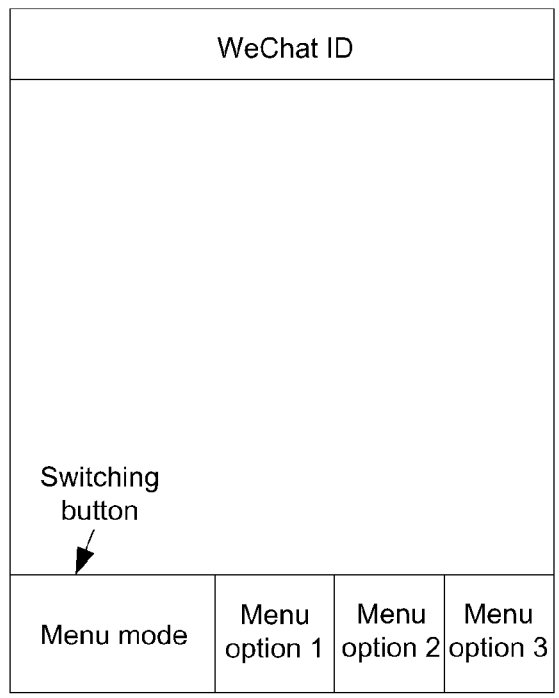
FIG. 4 is a schematic diagram illustrating a session interface including the menu options.
Figure 5:
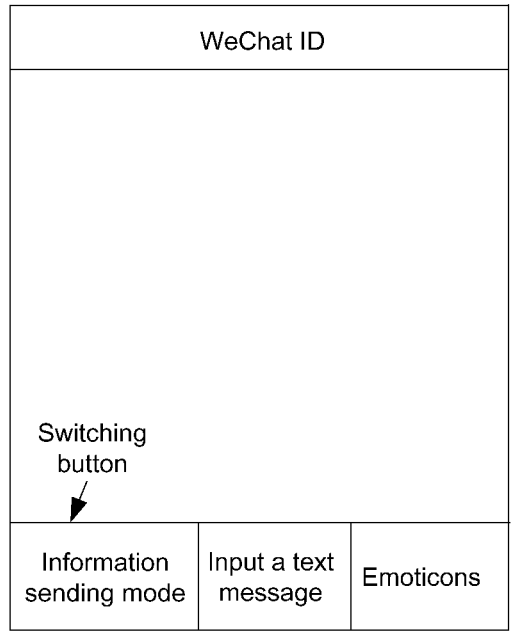
FIG. 5 is a schematic diagram illustrating a session interface including the information sending options.

In order to select the menu mode and the information sending mode, a switching button may be deployed on the session interface. The switching button may display the menu mode or the information sending mode by default. When the switching button displays the information sending mode, the menu mode is selected by clicking on the switching button once, and the menu options are displayed on the viewing screen. FIG. 4 is a schematic diagram illustrating a session interface including the menu options. Accordingly, when the switching button displays the menu mode, the information sending mode is selected by clicking on the switching button once, and the information sending options are displayed on the viewing screen. FIG. 5 is a schematic diagram illustrating a session interface including the information sending options.

In the conventional method, in the session interface, only the information sending options in the information sending mode are deployed. With these information sending options, the user merely may do several input operations, such as edit a text message, make a voice call, send a photo. In the present disclosure, both the menu options and information sending options may be displayed on the session interface via clicking on the switching button. With the technical scheme of the present disclosure, more options, i.e. the menu options, are provided to the user for the ease of use of the IM client device.

The menu options mentioned above may include a first-level menu to an Nth-level menu. N is an integer larger than 1. When the menu options include N levels menus, the method for generating, by the IM client device the first event request when the user clicks on the first menu option in the session interface includes: when the user clicks on an Mth-level menu, determining, by the IM client device, whether there is a (M+1)th-level menu, generating the first event request if there is no (M+1)th-level menu; otherwise, displaying the (M+1)th-level menu on the session interface, and generating the first event request when the user clicks on a menu option in the (M+1)th-level menu;. M is an integer larger than 1 and less than N−1.

In view of the above, multiple-level menus are implemented in the IM method. Through setting the multiple-level menus, more options for swift input are provided in the limited size of the viewing screen, which is convenient for the use of the IM client device.

In the method mentioned above, the IM server is a WeChat server, the IM client device is a WeChat client device, and the session interface is a session interface between a private number and a public number.

Referring to the examples in the accompanying drawings, the IM client device is described as follows.

Figure 6:
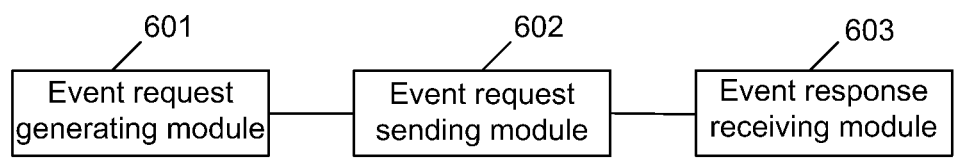
FIG. 6 is a schematic diagram illustrating an IM client device in accordance with a first example of the present disclosure.

Referring to FIG. 6, FIG. 6 is a schematic diagram illustrating an IM client device in accordance with a first example of the present disclosure. The IM client device includes an event request generating module 601, an event request sending module 602 and an event response receiving module 603. Menu options are deployed on a session interface displayed on a viewing screen of the IM client device.

The event request generating module 601 is to generate a first event request when a user clicks on a first menu option on the session interface.

The event request sending module 602 is to send the first event request to a third-party server via an IM server.

The event response receiving module 603 is to receive a first event response from the third-party server via the IM server In another example, the event request generating module 601 is further to generate a second event request when the user clicks on a second menu option on the session interface. The event request sending module 602 is further to send the second event request to the IM server. The event response receiving module 603 is further to receive a second event response from the IM server.

If the third-party server is a developer's server, the event request is a voice, a video, a photo or a text message. The event request sending module 602 is further to send the voice, video, photo or text message to the developer's server via the IM server, and the event response receiving module 603 is further to receive the event response from the developer's server via the IM server.

If the third-party server is a web server, the event request is a web viewing request. The event request sending module 602 is further to send the web viewing request to the web server via the IM server. The IM client device further includes a displaying module, configured to display a web pushed by the web server.

In practice, the menu options comprise: a first-level menu to an Nth-level menu. N is an integer larger than 1. The event request generating module 601 is further to determine, when the user clicks on an Mth-level menu, whether there is a (M+1)th-level menu, generate the first event request if there is no (M+1)th-level menu, otherwise, generate the first event request when the user clicks on a menu option in the (M+1)th-level menu. M is an integer larger than 1 and less than N−1.

Figure 7:
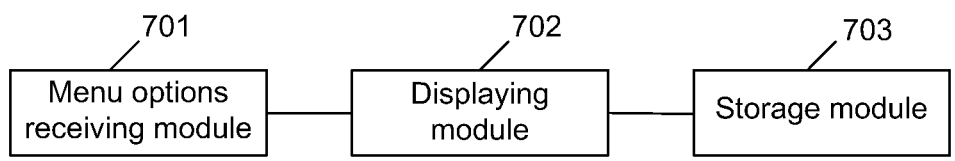
FIG. 7 is a schematic diagram illustrating an apparatus for displaying menu options in accordance with an example of the present disclosure.

Referring to FIG. 7, FIG. 7 is a schematic diagram illustrating an apparatus for displaying menu options in accordance with an example of the present disclosure. The apparatus includes a menu options receiving module 701, a displaying module 702 and a storage module 703.

The menu options receiving module 701 is to receive menu options configured by the IM server or the third-party server from the IM server, and send the menu options to the storage module 703.

The storage module 703 is to store the menu options.

The displaying module 702 is to display the menu options on the viewing screen of the IM client device.

In practice, the displaying module 702 may display the menu options in a row on the top or at the bottom of the session interface displayed on the viewing screen. In the alternative, the displaying module 702 may display the menu options at any location of the session interface of the viewing screen, and the user may drag and release the menu options at any location for ease of use.

In practice, the menu options may be made by the IM server or the third-party server. The IM server and the third-party server may periodically or randomly update the menu options. After the menu options are updated, the menu options receiving module 701 is further to receive the menu options updated by the IM server or the third-party server from the IM server. The storage module 703 is further to replace the menu options with the menu options updated by the IM server or the third-party server. The displaying module 702 is further to display the menu options updated by the IM server or the third-party server.

Figure 8:
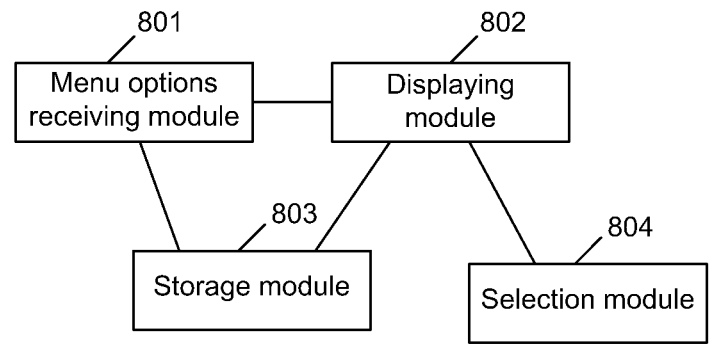
FIG. 8 is a schematic diagram illustrating an apparatus for displaying the menu options and the information input options in accordance with an example of the present disclosure.

Referring to FIG. 8, FIG. 8 is a schematic diagram illustrating an apparatus for displaying the menu options and the information input options in accordance with an example of the present disclosure. The apparatus includes a menu options receiving module 801, a displaying module 802, a storage module 803, and a selection module 804.

The menu options receiving module 801 executes the same operation as that of the menu options receiving module 701.

The storage module 803 is to store the menu options and information sending options.

The selection module 804 is to select a menu mode or an information sending mode, receive the menu options from the storage module 803 and send the menu options to the displaying module 802 when the menu mode is selected, receive the information sending options from the storage module 803 and send the information sending options to the displaying module 802 when the information sending mode is selected.

The displaying module 802 is to display the menu options when the menu mode is selected and display the information sending options when the information sending mode is selected.

In practice, the displaying module 802 is further to display a switching button on the session interface of the viewing screen.

The selection module 804 is further to select the menu module when the switching button displays the information sending mode and the user clicks on the switching button once, and select the information sending mode when the switching button displays the menu mode and the user clicks on the switching button once.

In the examples shown in FIGS. 6 to 8, IM server is a WeChat server, the IM client device is a WeChat client device, and the session interface is a session interface between a private number and a public number.

The above mentioned modules may be implemented by software, such as, instructions saved in the memory and executed by the processor, or implemented by hardware, such as an ASIC processor, or implemented by software and hardware. The present disclosure does not make limitation on the implementation modes.

Figure 9:
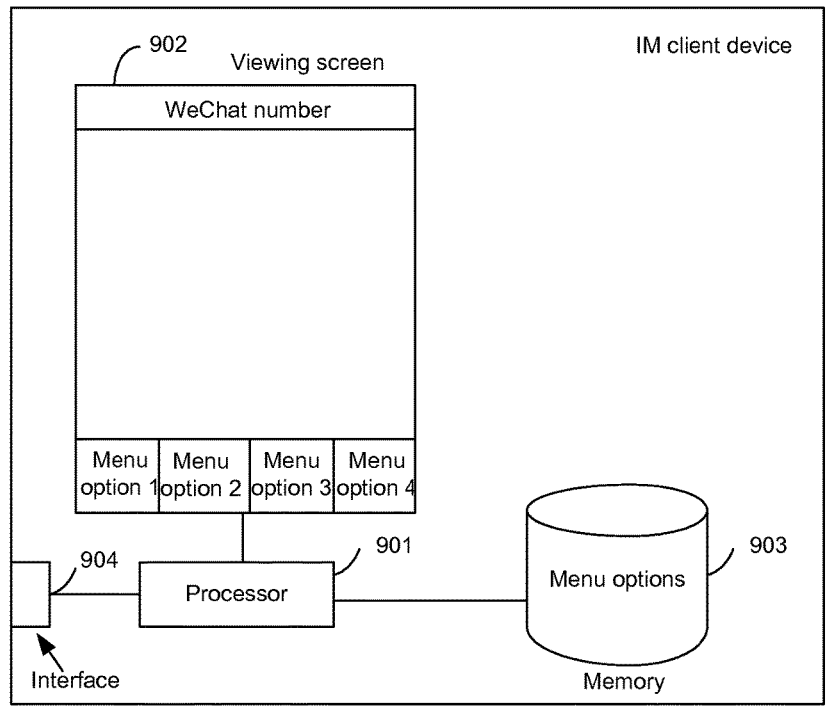
FIG. 9 is a schematic diagram illustrating an IM client device in accordance with a second example of the present disclosure.

Referring to FIG. 9, FIG. 9 is a schematic diagram illustrating an IM client device in accordance with a second example of the present disclosure. The IM client device includes: a processor 901, a viewing screen 902, a memory 903, and an interface 904.

The memory 903 is to store menu options.

The processor 901 is to send the menu options to the viewing screen 902.

The viewing screen 902 is to display the menu options on a session interface.

The processor 901 is to generate a first event request when a user clicks on a first menu option on the session interface;

send, via the interface 904, the first event request to a third-party server via an IM server; and receive, via the interface 904, a first event response from the third-party server via the IM server.

In an example, the processor 901 is further to generate a second event request when the user clicks on a second menu option on the session interface;

send the second event request to the IM server via the interface 904; and receive a second event response from the IM server via the interface 904.

If the third-party server is a developer's server, the event request is a voice, a video, a photo or a text message. The processor 901 is further to send, via the interface 904, the voice, video, photo or text message to the developer's server via the IM server; and receive, via the interface 904, the event response from the developer's server via the IM server.

If the third-party server is a web server, the event request is a web viewing request. The processor 901 is further to send, via the interface 904, the web viewing request to the web server via the IM server, and the viewing screen 902 is further to display a web pushed by the web server.

In an example, the memory 903 is further to store information sending options. The viewing screen 902 is further to display the menu options on the session interface when a menu mode is selected, and to display the information sending options when an information sending mode is selected.

In practice, the viewing screen 902 is further to display a switching button on the session interface. The processor 901 is further to select the menu mode if the user clicks on the switching button displaying the information sending mode once, and select the information sending mode if the user clicks on the switching button displaying the menu mode once.

The memory 903 is further to receive, via the interface 904, menu options updated by the IM server or the third-party server from the IM server and replace the menu options with the menu options updated by the IM server or the third-party server. The viewing screen 902 is further to display the menu options updated by the IM server or the third-party server.

The menu options may include multiple levels menu options. For instance, the menu options include a first-level menu to an Nth-level menu. N is an integer larger than 1. The processor is further to determine, when the user clicks on an Mth-level menu, whether there is a (M+1)th-level menu, generate the first event request if there is no (M+1)th-level menu, otherwise, generate the first event request when the user clicks on a menu option in the (M+1)th-level menu displayed on the viewing screen 902. M is an integer larger than 1 and less than N−1.

In the example shown in FIG. 9, the IM server is a WeChat server, the IM client device is a WeChat client device, and the session interface is a session interface between a private number and a public number.

An example further provides a method for performing IM using a menu option. An IM client device receives menu options configured by an IM server or a third-party server from the IM server, displays the menu options on a viewing screen of the IM client device when a menu mode is selected; and displays information sending options on the viewing screen when an information sending mode is selected. The menu options include: a first-level menu to an Nth-level menu, wherein N is an integer larger than 1.

The method includes:

determining, by the IM client device when a user clicks on an Mth-level menu, whether there is a (M+1)th-level menu;

generating an event request if there is no (M+1)th-level menu, otherwise, generating the event request when the user clicks on a menu option in the (M+1)th-level menu; wherein M is an integer larger than 1 and less than N−1, sending, by the IM client device, the first event request to a third-party server via an IM server; and receiving, by the IM client device, a first event response from the third-party server via the IM server.

Another example provides an IM client device for performing IM using a menu option. The IM client device includes a processor, a memory, an interface and a viewing screen.

The interface is to receive menu options configured by an IM server or a third-party server from the IM server;

the viewing screen is to display the menu options when a menu mode is selected, and display information sending options when an information sending mode is selected;

wherein the menu options include: a first-level menu to an Nth-level menu, wherein N is an integer larger than 1;

the memory is to store the menu options; and the processor is to determine, when a user clicks on an Mth-level menu, whether there is a (M+1)th-level menu;

generate an event request if there is no (M+1)th-level menu, otherwise, generating the event request when the user clicks on a menu option in the (M+1)th-level menu; wherein M is an integer larger than 1 and less than N−1, send the first event request to a third-party server via an IM server; and receive a first event response from the third-party server via the IM server.

Figure 10:
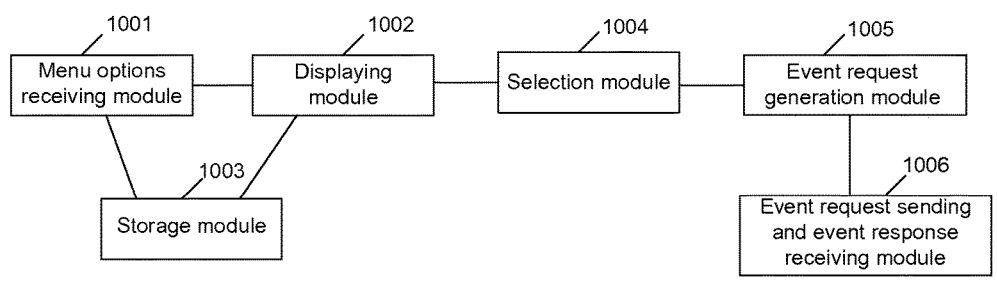
FIG. 10 is a schematic diagram illustrating an IM client device in accordance with a third embodiment of the present disclosure.

Referring to FIG. 10, FIG. 10 is a schematic diagram illustrating an IM client device in accordance with a third embodiment of the present disclosure.

The IM client device includes a menu options receiving module 1001, is a displaying module 1002, a storage module 1003, a selection module 1004, an event request generation module 1005 and an event request sending and event response receiving module 1006.

The menu options receiving module 1001 is to receive menu options configured by an IM server or a third-party server from the IM server.

The storage module 1003 is to store the menu options received by the menu options receiving module 1001.

The displaying module 1002 is to display the menu options when a menu mode is selected and display information sending options when an information sending mode is selected, and display a switching button.

The selection module 1004 is to select the menu mode when the switching button displays the information sending mode and the user clicks on the switching button once, instruct the displaying module 1002 to display the menu options, select the information sending mode when the switching button displays the menu mode and the user clicks on the switching button once, and instruct the displaying module 1002 to display the information sending options.

The menu options include a first-level menu to an Nth-level menu. N is an integer larger than 1.

The selection module 1004 is further to determine, when a user clicks on an Mth-level menu displayed by the displaying module 1002, whether there is a (M+1)th-level menu, instruct the event request generation module 1005 to generate an event request if there is no (M+1)th-level menu, otherwise, instruct the displaying module 1002 to display the (M+1)th-level menu, and instruct the event request generation module 1005 to generate the event request when the user clicks on a menu option in the (M+1)th-level menu. M is an integer larger than 1 and less than N−1.

The event request sending and event response receiving module 1006 is to send the event request generated by the event request generation module 1005 to the third-party via the IM server, and receive an event response from the third-party via the IM server.

The above are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for performing Instant Messaging (IM), the method comprising:
    displaying a first session interface of an IM application on a display of a client device, wherein:
        the first session interface is an interface of an IM session between (i) a private account associated with the client device and (ii) a public account associated with another device; and
        the first session interface includes (i) a plurality of menu options of a menu mode for retrieving respective web pages published by the public account and (ii) a first switching button for switching from the menu mode to an information sending mode for exchanging instant messages between the private account and the public account;
    detecting a first user selection of a first menu option of the plurality of menu options displayed on the first session interface, the first menu option corresponding to a universal resource locator (URL) identifying a web page published by the public account;
    in response to the first user selection,
        generating, by the client device, a first event request to retrieve the web page identified by the URL for viewing on the display of the client device;
        sending, by the client device, the first event request to an IM server for retrieving the web page identified by the URL;
        receiving, by the client device, a first event response including the web page from the IM server;
        displaying, by the client device, the web page on the first session interface of the IM application on the client device;
    detecting a second user selection of the first switching button on the session interface;
    in response to the second user selection,
        replacing the first session interface with a second session interface of the IM application, wherein the second session interface includes (i) a plurality of information sending options of the information sending mode substituting the plurality of menu options of the menu mode and (ii) a second switching button for switching from the information sending mode back to the menu mode; and
        receiving one or more third user inputs through the plurality of information sending options via the second session interface;
    in response to the one or more third user inputs, composing, by the client device, a message and sending the composed message from the private account to the public account via the IM server.

2. The method according to claim 1, wherein the first event request is sent to a third-party server via the IM server, and the first event response is received from the third-party server via the IM server, and wherein the method further comprises:
    sending, by the client device, a voice, a video, a photo or a text message to a developer's server via the IM server; and
    receiving, by the client device, the first event response from the developer's server via the IM server.

3. The method according to claim 1, further comprising:
    receiving and saving, by the client device, the menu options configured by the IM server or a third-party server from the IM server; and
    displaying, by the IM client device, the menu options on the first session interface.

4. The method according to claim 3, further comprising:
    receiving, by the client device, menu options updated by the IM server or the third-party server from the IM server;
    replacing, by the client device, the menu options with the menu options updated by the IM server or the third-party server; and
    displaying, by the client device, the menu options updated by the IM server or the third-party server.

5. The method according to claim 1, wherein the menu options comprise: a first-level menu to an Nth-level menu, wherein N is an integer larger than 1, wherein generating, by the client device, the first event request when the user clicks on the first menu option in the first session interface comprises:

when the user clicks on an Mth-level menu, determining, by the client device, whether there is a (M+1)th-level menu;

generating the first event request if there is no (M+1)th-level menu, otherwise, generating the first event request when the user clicks on a menu option in the (M+1)th-level menu; wherein M is an integer larger than 1 and less than N−1.

6. A client device for performing Instant Messaging (IM), comprising:

a processor, a memory, an interface and a viewing screen; wherein the memory is to store (i) a menu mode and associated menu options and (ii) an information sending mode and associated information sending options; and the processor is for performing the following operations:
displaying a first session interface of an IM application on a display of a client device, wherein:
the first session interface is an interface of an IM session between (i) a private account associated with the client device and (ii) a public account associated with another device; and
the first session interface includes (i) a plurality of menu options of a menu mode for retrieving respective web pages published by the public account and (ii) a first switching button for switching from the menu mode to an information sending mode for exchanging instant messages between the private account and the public account;
detecting a first user selection of a first menu option of the plurality of menu options displayed on the first session interface, the first menu option corresponding to a universal resource locator (URL) identifying a web page published by the public account;
in response to the first user selection,
generating, by the client device, a first event request to retrieve the web page identified by the URL for viewing on the display of the client device;
sending, by the client device, the first event request to an IM server for retrieving the web page identified by the URL;
receiving, by the client device, a first event response including the web page from the IM server;
displaying, by the client device, the web page on the first session interface of the IM application on the client device;
detecting a second user selection of the first switching button on the session interface;
in response to the second user selection,
replacing the first session interface with a second session interface of the IM application, wherein the second session interface includes (i) a plurality of information sending options of the information sending mode substituting the plurality of menu options of the menu mode and (ii) a second switching button for switching from the information sending mode back to the menu mode; and
receiving one or more third user inputs through the plurality of information sending options via the second session interface;
in response to the one or more third user inputs, composing, by the client device, a message and sending the composed message from the private account to the public account via the IM server.

7. The client device according to claim 6, wherein the processor is further to
send, via the interface, a voice, a video, a photo or a text message to a developer's server via the IM server; and
receive, via the interface, the first event response from the developer's server via the IM server.

8. The client device according to claim 6, wherein
the memory is further to receive, via the interface, menu options updated by the IM server or the third-party server from the IM server and replace the menu options with the menu options updated by the IM server or the third-party server; and
the viewing screen is further to display the menu options updated by the IM server or the third-party server.

9. The client device according to claim 6, wherein the menu options comprise:
a first-level menu to an Nth-level menu, wherein N is an integer larger than 1,
wherein the processor is further to
determine, when the user clicks on an Mth-level menu, whether there is a (M+1)th-level menu;
generate the first event request if there is no (M+1)th-level menu, otherwise, generate the first event request when the user clicks on a menu option in the (M+1)th-level menu displayed on the viewing screen; wherein M is an integer larger than 1 and less than N−1.

10. A non-transitory computer readable storage medium storing one or more programs, the one or more programs comprising instructions that, when executed by one or more processors of a client device, cause the client device to perform operations comprising:
displaying a first session interface of an IM application on a display of a client device, wherein:
the first session interface is an interface of an IM session between (i) a private account associated with the client device and (ii) a public account associated with another device; and
the first session interface includes (i) a plurality of menu options of a menu mode for retrieving respective web pages published by the public account and (ii) a first switching button for switching from the menu mode to an information sending mode for exchanging instant messages between the private account and the public account;
detecting a first user selection of a first menu option of the plurality of menu options displayed on the first session interface, the first menu option corresponding to a universal resource locator (URL) identifying a web page published by the public account;
in response to the first user selection,
generating, by the client device, a first event request to retrieve the web page identified by the URL for viewing on the display of the client device;
sending, by the client device, the first event request an IM server for retrieving the web page identified by the URL;
receiving, by the client device, a first event response including the web page from the IM server;
displaying, by the client device, the web page on the first session interface of the IM application on the client device;
detecting a second user selection of the first switching button on the session interface;
in response to the second user selection, replacing the first session interface with a second session interface of the IM application, wherein the second session interface includes (i) a plurality of information sending options of the information sending mode substituting the plurality of menu options of the menu mode and (ii) a second switching button for switching from the information sending mode back to the menu mode; and receiving one or more third user inputs through the plurality of information sending options via the second session interface;

in response to the one or more third user inputs, composing, by the client device, a message and sending the composed message from the private account to the public account via the IM server.

* * * * *